United States Patent [19]
Cook et al.

[11] Patent Number: 5,724,517
[45] Date of Patent: Mar. 3, 1998

[54] METHOD FOR GENERATING A TOPOLOGY MAP FOR A SERIAL BUS

[75] Inventors: Sherri E. Cook, Boca Raton; Andrew B. McNeill, Jr., Deerfield, both of Fla.

[73] Assignee: International Business Machines Corporation, Armonk, N.Y.

[21] Appl. No.: 313,679

[22] Filed: Sep. 27, 1994

[51] Int. Cl.$^6$ ........................................ G06F 13/00
[52] U.S. Cl. .............. 395/200.57; 395/200.68; 395/200.79; 395/200.83; 364/DIG. 1
[58] Field of Search ................ 395/800, 200.01, 395/200.15, 200.03, 200.06, 200.57, 200.68, 200.79, 200.83; 364/DIG. 1

[56] References Cited

U.S. PATENT DOCUMENTS

| | | | |
|---|---|---|---|
| 4,987,536 | 1/1991 | Humblet | 364/200 |
| 5,138,615 | 8/1992 | Lamport | 370/94.3 |
| 5,394,556 | 2/1995 | Oprescu | 395/800 |
| 5,469,439 | 11/1995 | Thaler et al. | 370/94.3 |
| 5,515,510 | 5/1996 | Kikinis | 395/200.02 |
| 5,522,046 | 5/1996 | McMillen et al. | 395/200.15 |

OTHER PUBLICATIONS

"IEEE Standard for a High Performance Serial Bus", The Institute Of Electrical And Electronic Engineers, Inc. Draft 7.1v1, IEEEP1394, Aug. 5, 1994.

Marazas, et al., "Information Technology—SCSI-3 Serial Bus Protocol (SBP)", X3T10 992D, Rev. 18, Working Draft, Aug. 11, 1994.

*Primary Examiner*—Alyssa H. Bowler
*Assistant Examiner*—Dzung C. Nguyen
*Attorney, Agent, or Firm*—Bernard D. Bogdon

[57] ABSTRACT

A method and system for mapping a node topology is disclosed. The node topology is based on a computer system comprised of a high performance acyclic serial bus and a plurality of nodes coupled to the acyclic serial bus. Each node further includes an identification packet. The mapping topology establishes a root node based upon information found in each identification packet and establishes at least one branch node among the nodes based on the information. Next, the topology mapping method selects a first available branch node among the available branch nodes based on the information. The system then identifies any of the nodes that are child nodes to the first available branch node. Upon identifying all child nodes of the branch node, the system selects a next available branch node based upon the information. The processing continues until the root node is processed as a branch node.

13 Claims, 4 Drawing Sheets

METHOD FOR GENERATING A TOPOLOGY MAP FOR A SERIAL BUS

Notice: © Copyright, International Business Machines Corporation 1994: A portion of the Disclosure of this patent document contains material which is subject to copyright protection. The copyright owner has no objection to facsimile reproduction by anyone of the patent document or the patent disclosure, as it appears in the U.S. Patent and Trademark Office, patent file or records, but otherwise reserves all rights in its copyright whatsoever.

CROSS-REFERENCE TO RELATED APPLICATION

The present application is related to U.S. patent application Ser. No. 08/313,680, entitled "Method And System For Matching Packet Size For Efficient Transmission Over a Serial Bus," U.S. patent application Ser. No. 08/312,854, entitled "Acyclic Cable Bus Having Redundant Path Access", U.S. patent application Ser. No. 08/313,483, entitled "Method For Selecting Transmission Speeds For Transmitting Data Packets Over A Serial Bus", U.S. patent application Ser. No. 08/312,746, entitled "Method And System For Determining Maximum Cable Segments Between All Possible Node To Node Paths On A Serial Bus", U.S. patent application Ser. No. 08/313,490, entitled "Method And System For Automatically Generating A Read Response Packet With Speed Matching Over A Serial Bus", U.S. patent application Ser. No. 08/313,638, entitled "Method And System For Dynamically Appending Data To Data Structures For Transmission Over A Serial Bus", and all filed of even date herewith by the inventors hereof and assigned to the assignee herein, and incorporated by reference herein.

BACKGROUND OF THE INVENTION

1. Technical Field

The present invention is generally related to a high performance serial bus and, more particularly, to a method of configuration management for a high performance serial bus. More specifically, the present invention relates to a method of generating a topological map of a serial bus having assorted bus nodes and interconnections for optimizing interpacket transmission delay and speed between any two nodes.

2. Description of the Related Art

The IEEE High Performance Serial Bus P1394 (hereinafter P1394) proposed standard defines an electrical and physical interface for interconnection of 1394 devices, or nodes, via cables or an electrical backplane. The P1394 standard also defines various signalling and data transmissions protocols that are required to configure the collection of nodes into a working network and to support the configurations, which may include daisy chains or tree topologies; however, no loops are allowed in any of these topologies. Up to 63 nodes may be connected to a single 1394 bus and multiple busses may also be interconnected via 1394 bridge nodes. Up to 16 cable segments, or hops, may be present between any two nodes on the bus. In order to achieve optimum bus performance, the interpacket transmission gap time, or delay, is set as small as possible based on the maximum number of cable hops between any two devices. The maximum number of cable hops between any two devices connected to the bus can be determined if the bus topology is known.

The 1394 standard defines three possible speeds at which data packets can be transmitted between nodes on the bus.

2

The possible speeds are approximately 100, 200, and 400 megabits per second. The maximum speed at which a data packet can be transmitted depends on the bus topology and the data transmission speeds supported by various nodes on the bus. The transmission speeds supported by a given node are determined by its physical layer, or PHY, hardware implementation. Any Phy that supports a particular maximum speed must also support all slower speeds. To determine the optimum speed at which a data packet can be sent, the maximum supported speeds of the transmitting and receiving nodes, as well as the maximum speed of any nodes connected between these nodes must be determined. The optimum speed for data transmission is equal to the highest speed that is supported by all the nodes that are required to participate in the transmission of the data packet. A topological map of the bus network is required in order to determine the optimum packet transmission speed.

Whenever a node is added to or removed from the 1394 bus, a bus reset occurs that forces all nodes to a known state. After the bus reset, the tree identify (ID) process translates the general network topology into a tree, where one node is designated a root and all of the physical connections are labeled as either a parent, a child, or as unconnected. Any unconnected ports are labeled as "off" and do not participate any further. The tree must be acyclic, meaning no loops allowed; otherwise, the tree ID process will not be completed.

After the tree ID phase, the next step is the self ID phase that results in each node being assigned a unique physical ID. During the self ID phase, each node on the bus is given an opportunity to transmit one to four short, or runt, packets onto the cable that includes the physical ID, port connection status, and some additional management information. The physical ID is simply the count of the number of times a node passes through the state of receiving self ID information before having its own opportunity to do so. Based on the information in the self ID packet, power management can be performed and bus topological information can be obtained.

The self ID process uses a deterministic selection process where the root node passes control of the media to the node attached to its lowest numbered connected port and waits for that node to signal that it and all of its children have transmitted their self ID packets. The root then passes control to its next highest port and warts for that node to finish. When the nodes attached to all the root's ports have finished, the root itself transmits its self ID packet. The child nodes use the same process in a recursive manner. Once this process is completed, the self ID phase is complete and all information necessary to determine the bus topology is contained in the self ID packets that were transmitted.

Accordingly, what is needed is a method for supporting configuration management of a 1394 high performance bus that efficiently builds and represents a topological map of the bus network. Further, what is needed is a topological map of bus nodes, or devices, and interconnections, or cable segments, to determine the maximum number of cable segments, or hops, between any two nodes to allow optimization of the interpacket transmission gap time, or delay, and also to determine the maximum data packet transmission speed between any two nodes. Additionally, what is needed is a method of building a topology map based solely on the number of children at each node and representing the map in a linear list based solely on the parent relationship of each node.

SUMMARY OF THE INVENTION

It is therefore one object of the present invention to provide a high performance serial bus.

It is another object of the present invention to provide a method of configuration management for a high performance serial bus.

It is yet another object of the present invention to provide a method of generating a topological map of a serial bus having assorted bus nodes and interconnections for optimizing interpacket transmission delay and speed between any two nodes.

The foregoing objects are achieved as is now described. According to the present invention, a method and system for mapping a node topology is disclosed. The node topology is based on a computer system comprised of a high performance acyclic serial bus and a plurality of nodes coupled to the acyclic serial bus. Each node further includes an identification packet. The mapping topology establishes a root node based upon information found in each identification packet and establishes at least one branch node among the nodes based on the information. Next, the topology selects a first available branch node among the available branch nodes based on the information. The system then identifies any of the nodes that are child nodes to the first available branch node. Upon identifying all child nodes of the branch node, the system selects a next available branch node based upon the information. This is repeated until the root node is processed as a branch node.

The information used to develop the topology includes the number of branch and children nodes among the plurality of nodes. Priority information is also used, such that a ranking of the of nodes is performed, with the root node having the highest ranking.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
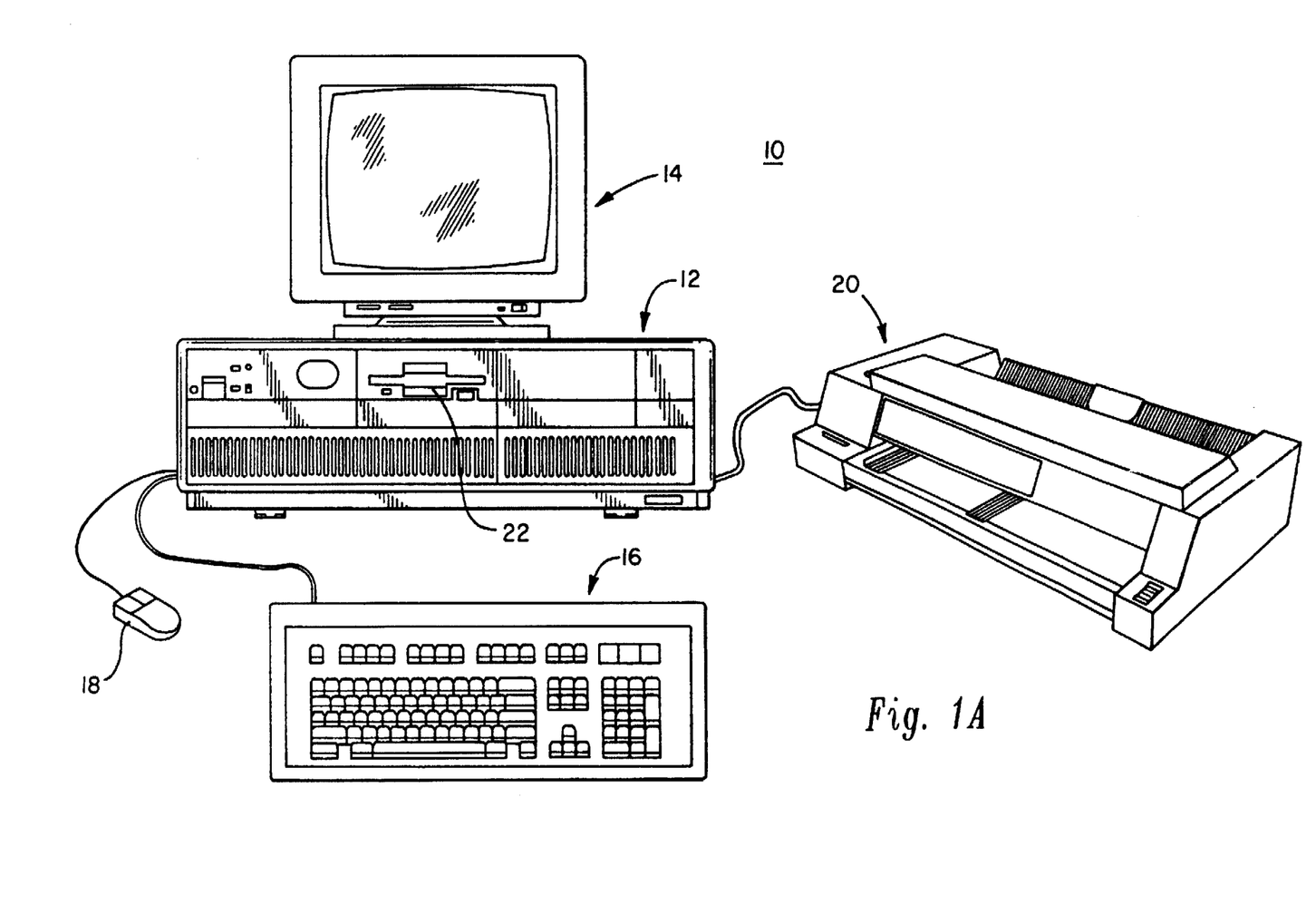
FIG. 1A depicts a data processing system in the form of a personal computer in which the present invention can be employed is depicted.

Referring now to the figures, and in particular to FIG. 1A, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 1B:
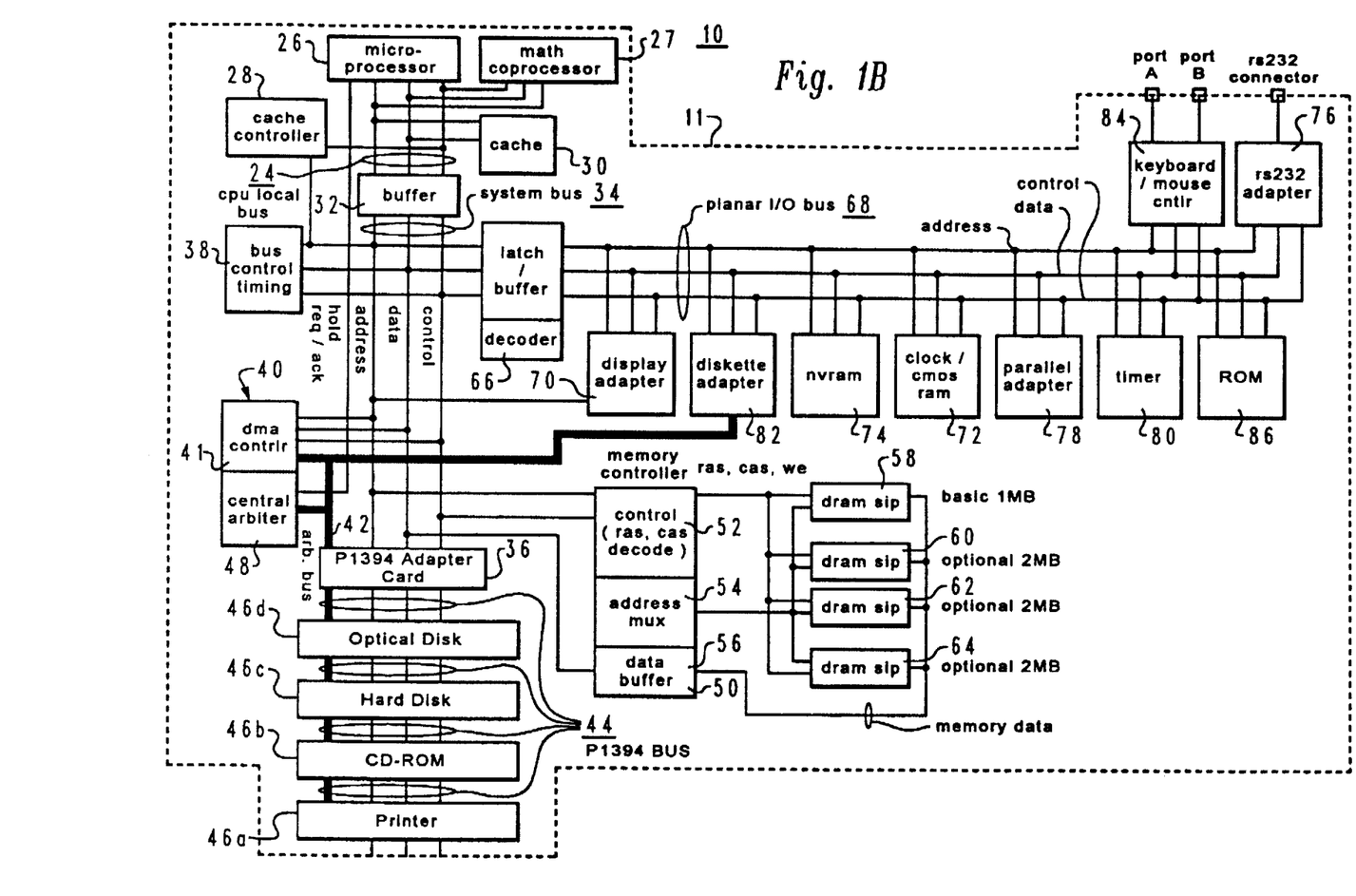
FIG. 1B is a block diagram of a personal computer system illustrating the various components of a personal computer system in accordance with the present invention.

Prior to relating the above structure to the present invention, a summary of the operation in general of personal computer system 10 may merit review. Referring to FIG. 1B, there is shown a block diagram of planar 11 personal computer system 10 illustrating the various components of personal computer system 10 in accordance with the present invention. FIG. 1B further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 1B, it is to be understood at the outset of the description which follows, that it is contemplated that the apparatus and methods in accordance with the present invention may be used with other hardware configurations of the planar board. For example, the system processor could be an Intel 80286, 80388, or 80486 microprocessor. These particular microprocessors can operate in a real addressing mode or a protected addressing mode. Each mode provides an addressing scheme for accessing different areas of the microprocessor's memory.

Returning now to FIG. 1B, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a P1394 adapter card 36. System bus 34 is further connected to a bus control and timing unit 38 and a Direct Memory Access (DMA) unit 40. DMA unit 40 is comprised of a central arbitration unit 48 and a DMA controller 41. P1394 adapter card 36 provides an interface between the system bus 34 and the P1394 Serial Bus 44. Connected to P1394 bus 44 are a plurality of devices or nodes 46a–46d such as optical disk, hard disk, CD-ROM, etc. In the depicted example, node 46c is a hard disk drive, node 46b is a CD-ROM drive, and node 46a is a printer device connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexor 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 1B by the optional memory modules 60, 62 and 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Since each P1394 node within the computer of FIG. 1A may operate at one of three speeds, there needs to be an efficient method by which a bus topology map can be constructed using the self ID packets. An efficient data structure for representing this bus topology map is useful in order to minimize packet transmission time between any two nodes in the network. The map is necessary to determine the maximum number of cable hops between any two devices, or nodes, for tuning the interpacket transmission gap timing, and also to determine the maximum data transmission speed between any two nodes.

In order to construct a bus topology map, upon completion of the self ID phase, all self ID packets must have been stored in memory. Because multiple packets can be associated with a given node, it is necessary to consolidate the information about a node into a data structure. The data structure is typically a 4-byte structure representing all information associated with a single node. An array of structures represents all information associated with multiple nodes, with the node ID used as a direct index into the array. An example of a data structure is illustrated below in Table I.

```
struct node_info
{
    unsigned char parent;         //number of parents & parent of node
    unsigned char children;       //number of children
    unsigned int speed       :2;  //speed of this node          2 bits
    unsigned int gap_cnt     :6;  //gap count                   6 bits
    unsigned int link        :1;  //link power status           1 bit
    unsigned int power       :3;  //power class                 3 bits
    unsigned int config_mgrc :1;  //config manager capable      1 bit
    unsigned int speed2init  :2;  //speed from node to initiator
    unsigned int leaf        :1;  //leaf node = 1, non-leaf node = 0
} node{MAX_DEVICES};              //array of nodes
```

The information stored in each node cell in the array includes the physical layer, or PHY, maximum data transmission speed, whether the node has an active link layer, the gap count, the power consumption, whether the node is a contender for the configuration manager function, the number of children associated with the node, and the number of parents associated with the node. The number of children associated with each node is important in that it is the information that is used to determine the topology map. The parent field is initially used to save the number of parents associated with each node. This information is used to check the validity of the self ID packets because each node has only a single parent or no parent, as is the case for the root. This parent field is also used by the topology method to store the parent ID associated with each child node. A description of the self ID packets is found in the attached Appendix A. The contents of Appendix A are taken from the IEEE High Performance Serial Bus P1394, which establishes the full parameters of protocol and requirements for operating on the high performance bus standard P1394, which reference is incorporated by reference for all purposes.

The array is used to compute the power information, determine the configuration manager, determine if the link is powered on, and to represent the topology map. For the first three uses, a linear search of the array is necessary to process the information. By also representing the topology map in this array, a single data structure is used to represent all information.

The first step in determining the topology is to save the information from the self ID packets into the data structure. One method of consolidating all self ID packet information for a given node into the appropriate node cell in the array is found in the pseudo code of Appendix B. Next, the system determines if the topology information from the self ID packets is valid. Importantly, the root node will never have a parent; thus, node.parent$_{root}$ equals zero. Every node except the root node will have one and only one parent. Thus, for each node, node.parent$_i$ will equal one. Because each child has only a single parent, except the root node, the system then represents the topology map by only storing the parent associated with each node. This information is stored directly in an array. Thus, an array of parents represents the full topology with the index being a child node. This is an efficient representation, which is more efficient than a linked list or a tree structure. The representation is generated by the topology method described below, as based on the code shown in Appendix C.

The method to build the topology map relies solely on the number of children associated with a given node and the following facts from the IEEE 1394 High Performance Serial Bus standard document. First, each node has at most one parent. Second, with the exception of the root, a node with zero children is considered a leaf. A leaf node has only one connected port; this port is a parent port. Third, with the exception of the root, a node with one or more children is considered a branch. A branch node has two or more connected ports; these ports are one parent port and one or more child ports. For the purpose of the topology mapping method, the root is always processed as a branch node, except for the single node as root case. Fourth, the highest ranking branch/leaf, i.e. the one with the highest node ID numbered port, is the one that must be connected to the highest numbered next available child port. Fifth, each parent has a higher node ID than each of its children from the self ID process.

Figure 2:
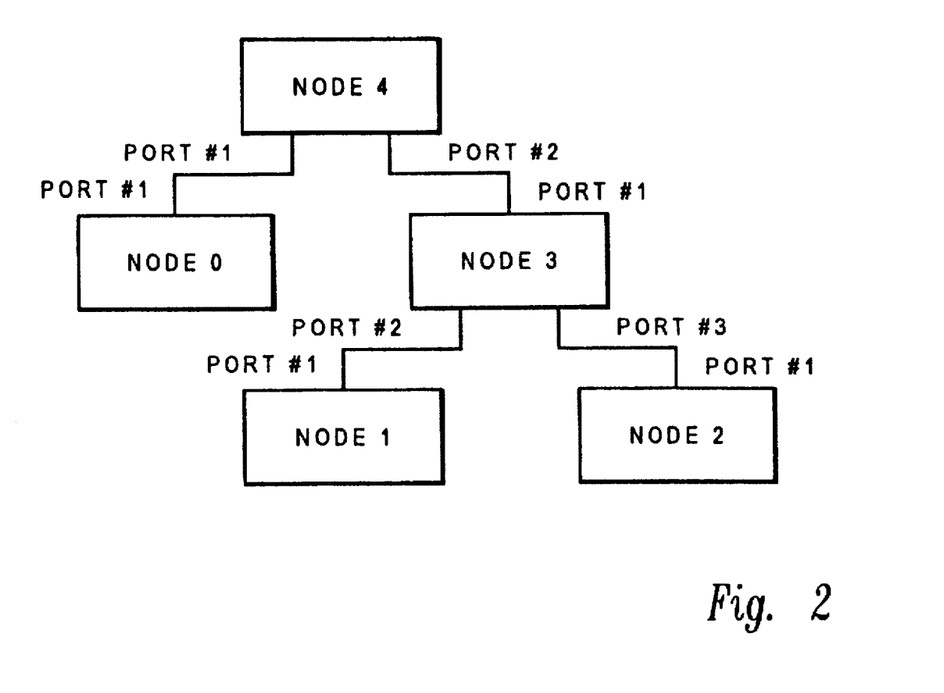
FIG. 2 is a block diagram representing a tree topology network node arrangement according to the present invention; and, FIG. 3 depicts a flowchart illustrating how a topology map may be generated according to the present invention.
Figure 3:
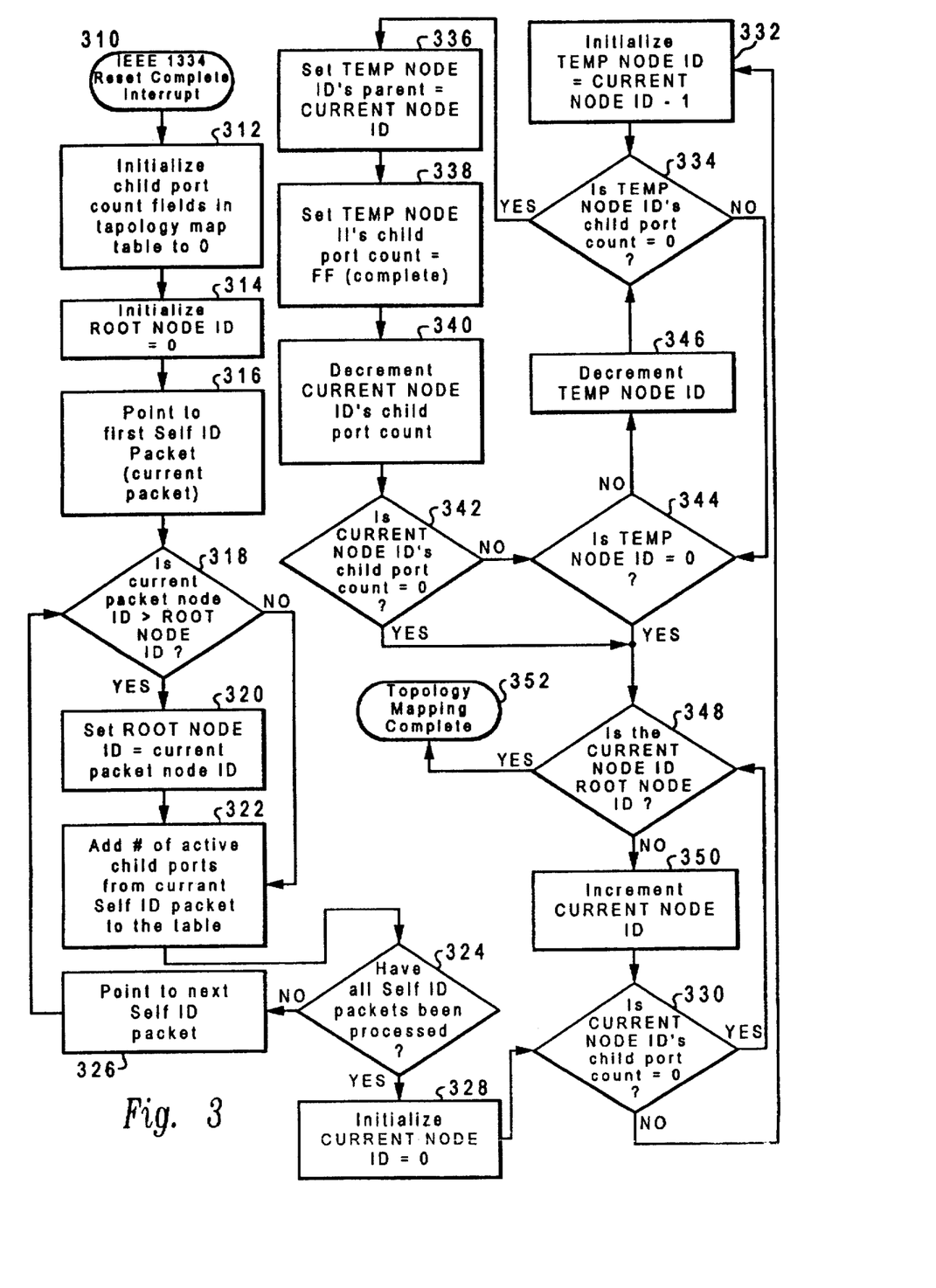

An example of a bus topology is illustrated in FIG. 2. This example is the basis for the description of the topology mapping method. It is understood that this example is just one possible topology for the given cable configuration. The topology map generated will always reflect the information in the self ID packets. Thus, if this topology were different, the information in the self ID packets also would be different. The method for generating the topology map is depicted in the flowchart of FIG. 3. In step 310, the networking system completes an IEEE 1394 reset and interrupt. Next, in step 312, the system initializes the child port count fields in the topology map table to zero. In step 314, the system then initializes the root node ID to be equal to zero. Proceeding to step 316, the system points to the first self ID packet, which is the current packet. In step 318, the system determines whether the current packet node ID is greater than the root node ID. If the node ID is greater than the root ID, the system, in step 320 sets the root node ID equal to the current packet node ID. If the node ID is not greater than the root node ID in step 318, or after the completion of step 320, the system, in step 322, adds the number of active child ports from the current self ID packet to the table. In step 324, the system then determines whether all the self ID packets have been processed. If not, in step 326, the system points to the next self ID packet before returning to step 318. If all packets have been processed, the system, in step 328, initializes the current node ID to be zero.

After initializing the current node to be zero, the system, in step 330, determines whether the current node ID's child port count is equal to zero and if not, the system proceeds to step 332; otherwise, the system proceeds to step 348. In step 332, the system initializes the temp node ID to be equal to the current node ID less one node. Proceeding to step 334, the system determines whether the temp node ID's child port count is equal to zero and if so, proceeds to step 336; otherwise, the system proceeds to step 344.

In step 336, the system sets the temp node ID's parent equal to the current node ID and then, in step 338, sets the temp node ID's child port count equal to FF, which signifies completion. In step 340, the system decrements the current node ID's child port counter. In step 342, the system determines whether the current node ID's child port count is equal to zero. If the child port count is not equal to zero, the system, in step 344, determines if the temp node ID is equal to zero. If the temp node is not equal to zero, then the system decrements the temp node ID in step 346 and returns to step 334. If the temp node ID is equal to zero, then the system proceeds to step 348 where it is determined whether the current node ID is equal to the root node ID, and if not then proceeds to step 350. In step 350, the system increments the current node ID and proceeds to step 330.

If in step 330, the current node ID's child port count is equal to zero, then, in step 348, the system determines whether the current node ID equals the root node ID, and if yes, the system completes the topology map in step 352.

This particular method operates efficiently in that there is no recursion, traversed linked lists, or traversed tree structures. Further, this system merely relies on the knowledge of how many children a parent has, and that a parent always has a higher node than its child, and that the highest ID leaf that is also a lower ID than the branch must be a child of that branch. With this information, the method constructs the topology map from the bottom up. The map is generated by looking at each branch as a sub-tree. When the sub-tree is complete, that branch is collapsed into a leaf. This is done until the entire topology map is complete.

Furthermore, the number of times that the central part of the loop is executed equals the number of children in the topology. In the example of FIG. 2, there are four children and thus four passes. In each of these passes, a single parent is associated with a child/leaf node. This is the initial state after parsing the self ID packets.

| node | no. of children | parent |
| --- | --- | --- |
| 0 | 0 (leaf) | X (X = don't care) |
| 1 | 0 (leaf) | X |
| 2 | 0 (leaf) | X |
| 3 | 2 (branch) | X |
| 4 | 2 (branch) | X |

The first branch node is used to determine its children. Branch node 3 has two children. It is known that it must be connected to the highest numbered leaf that is a lower ID than this branch. Since node 2 is the highest ID leaf, it is also a lower ID than this branch. Node 3 is marked as the parent of node 2, and node 2's children are marked as FF to indicate that this leaf has been completed. Then the number of children under node 3 is decremented.

| node | no. of children | parent |
| --- | --- | --- |
| 0 | 0 (leaf) | X |
| 1 | 0 (leaf) | X |
| 2 | FF (done) | 3 |

-continued

| node | no. of children | parent |
|------|-----------------|--------|
| 3    | 1 (branch)      | X      |
| 4    | 2 (branch)      | X      |

In continuing with branch node 3 until finishing with its sub-tree, the system then finishes when the number of children at this branch is zero. Branch node 3 now has one child left. From this it is known that it must be connected to the highest numbered leaf that is a lower ID than this branch. Since node 1 fits this description, node 3 is marked as the parent of node 1 and node 1's children are marked as FF to indicate that the system has completed this leaf, and the number of children under node 3 is decremented one more. Now that node 3 has zero children, the sub-tree for node 3 is completed and is now considered a leaf.

| node | no. of children | parent |
|------|-----------------|--------|
| 0    | 0 (leaf)        | X      |
| 1    | FF (done)       | 3      |
| 2    | FF (done)       | 3      |
| 3    | 0 (leaf)        | X      |
| 4    | 2 (branch)      | X      |

The system then continues with branch node 4 until all of its children are determined. Branch node 4 has two children. It is also known that branch node 4 must be connected to the highest numbered leaf that is a lower numbered ID than this branch. Since node 3 is the highest ID leaf that is also a lower ID than this branch, node 4 is marked as the parent of node 3. Node 3's children are also marked as FF to indicate that this leaf is completed and the number of children under node 3 is then decremented.

| node | no. of children | parent |
|------|-----------------|--------|
| 0    | 0 (leaf)        | X      |
| 1    | FF (done)       | 3      |
| 2    | FF (done)       | 3      |
| 3    | FF (done)       | 4      |
| 4    | 1 (branch)      | X      |

The system continues with branch node 4 until its sub-tree is finished. Branch node 4 now has one child left. The system knows that node 0 is the highest ID leaf that is also a lower ID than this branch. Thus, the system marks node 4 as the parent of node 0, and then marks node 0's children as FF to indicate that the system has finished with this leaf, and then the system decrements the number of children under node 4. Now that node 4 has zero children, the system has finished with its sub-tree and it is now considered a leaf. Since there are no more branches, the topology map is complete.

| node | no. of children | parent |
|------|-----------------|--------|
| 0    | FF (done)       | 4      |
| 1    | FF (done)       | 3      |
| 2    | FF (done)       | 3      |
| 3    | FF (done)       | 4      |
| 4    | 0 (leaf)        | X      |

By the time the system has generated all the sub-trees, the system has determined the topology via a bottom-up approach. Thus, the topology map in FIG. 2 is represented by the following array information:

| node | parent |
|------|--------|
| 0    | 4      |
| 1    | 3      |
| 2    | 3      |
| 3    | 4      |
| 4    | X (root has no parent) |

It has been shown in the present invention that a topology map can be constructed efficiently along with a data structure for representing the topology map.

While the invention has been particularly shown and described with reference to a preferred embodiment, it will be understood by those skilled in the art that various changes in form and detail may be made therein without departing from the spirit and scope of the invention.

Appendix A. Self ID Packet Description 4.3.4.1 Self-ID Packet

The cable PHY sends one to four self-ID packets at the base rate during the self-ID phase of arbitration. The number of self-ID packets sent depends on the maximum number of ports it has. The cable PHY self-ID packets have the following format:

| Figure 4-18 - Self ID packet format | |
|---|---|
| transmitted first | transmitted first |
| 10 phy_ID 0 1 gap_cnt sp del c pwr p1 p2 p3 i m | 10 phy_id 1 n rsv pa pb pc pd pe pf pg ph r m |
| logical inverse of first quadlet | logical inverse of first quadlet |
| transmitted last | transmitted last |
| self_ID packet #0 | self_ID packet #1, #2, & #3 |
| |         n  ps  pb  pc  pd  pe  pf  pg  ph |
| | pkt #1  0  p3  p4  p5  p6  p7  p8  p9  p10 |
| | pkt #2  1  p11 p12 p13 p14 p15 p16 p17 p18 |
| | pkt #3  2  p19 p20 p21 p22 p23 p24 p25 p26 |
| | for n = 3 through 7, fields ps through ph are reserved |

TABLE 4-29

Self-ID packet fields

| Field | Derived from | Comment |
|---|---|---|
| 10 | | Self-Id packet identifier |
| phy_ID | physical_ID | Physical node identifier of the sender of this packet |
| gap_cnt | gap_count | Current value for all nodes' PHY_CONFIGUARTION gap_count field. |
| l | link_active | If set, this node has an active Link and Transaction Layer |
| sp | PHY_SPEED | speed capabilities:<br>00 98.304 Mbit/sec<br>01 98.304 and 196.608 Mbit/sec<br>10 98.304, 196.608, and 393.216 Mbit/sec<br>11 reserved for future definition |
| del | PHY_DELAY | worst case repeater data delay:<br>00 ≦ 144 ns (-14/BASE_RATE)<br>01 reserved<br>10 reserved<br>11 reserved |
| c | CONTENDER | If set and the link_active flag is set, this node is a contender for the bus or limited manager as described in clause 8.4.2. |
| pwr | POWER_CLASS | Power consumption and source characteristics:<br>000 node is self powered, but does not provide power to the bus<br>001 node is self powered, and provides a minimum of 15 W to the bus<br>010 node is self powered, and provides a minimum of 30 W to the bus<br>011 node is self powered, and provides a minimum of 45 W to the bus<br>100 node is powered from the bus, and is using up to 1 W.<br>101 node is powered from the bus, and is using up to 1 W. An additional 1 W is needed to enable the Link and higher layers[a].<br>110 node is powered from the bus, and is using up to 1 W. An additional 2 W is needed to enable the Link and higher layers.<br>111 node is powdered from the bus, and is using up to 1 W. An additional 3 W is needed to enable the Link and higher layers. |
| p0 ... p26 | NPORT, child[NPORT], connected [NPORT] | Port status:<br>11 connected to child node<br>10 connected to parent node<br>01 not connected to any other PHY<br>00 not present on this PHY |
| i | initiated_reset | If set, this node initiated the current bus reset (i.e., it started sending a bus_reset signal before it received one)[b] (Optional. If not implemented, this bit must be returned as a zero) |
| m | more_packets | If set, another self-ID packet for this node will immediately follow (i.e., if this bit is set and the next self_ID packet received has a different phy_ID, then a self_ID packet was lost) |
| n | | Extended self-ID packet sequence number (0 through 2, corresponding to self-ID packets #1 through #3) |
| r, rsv | | reserved for future definition, set to zeros |

[a] The link and higher layers are enabled by the Link-On PHY packet described in clause 4.3.4.2.

```
root = 0                    //root is always the highest numbered node
for i = 1 to number of self ID packets
{
    if packet_id_i < > 10   //make sure this is a valid self ID packet
        then error
    id = physical_id_i
    if id > root            //save highest node (root) as total number
        then root = id      //of nodes
    if self ID packet type #0
    {
        node.speed_id = speed_i
        node.link_id = link_active_i
        node.gap_cnt_id = gap_count_i
        node.power_class_id = power_class_i
        node.config_mgr_id = config_mgr_capable_i
        for ports 1 - 4     //packet 0 has ports 1 - 4
            if port = = 11  // if child connection
                node.children_id+ +   //increment number of children
            else if port = = 10       //if parent connection
                node.parent_id+ +     //increment number of parents
    }
    else (self ID packet type #n)
        for port a - 1      //packet n has ports > 4
            if port = = 11  //if child connection
                node.children_id+ +   //increment number of children
```

```
            else if port = = 10       //if parent connection
                node.parent_id+ +     //increment number of parents for i = 0 to root                     //loop thru branch nodes
    if node.children_i < > 0          //skip if node is a leaf
        for j = i-1 down to 0         //loop thru leaf nodes
            if node.children_j = = 0  //skip if node is not a leaf
            {
                node.parent_j = 1     //save parent of this node
                node.children_j = 0ffh //signify done with leaf
                node.children_i-     //decrement no. of children
                if node.children_i = = 0 //if no children, then this
                    break            //sub-tree is finished
            }
```

We claim:

1. In a computer system, including a host computer, comprising an acyclic serial bus and a plurality of nodes coupled to said acyclic serial bus, each node having an identification packet, a method for mapping a node topology comprising the steps of:

A. storing in the host computer a topology mapping table for the plurality of nodes information from all of said identification packets associated with each node of said plurality of nodes;

B. establishing a root node based upon the information found in said identification packets;

C. establishing at least one branch node among said plurality of nodes based on said information;

D. selecting a first available branch node among said at least one branch node based on said information;

E. identifying any of said plurality of nodes that are child nodes to said first available branch node;

F. upon identification of all child nodes of said branch node, selecting a next available branch node based upon said information; and G. upon identification of said next available branch, identifying any of said plurality of nodes that are children nodes to said next available branch node, then repeat steps E and G until said root node is processed as a branch node.

2. The method according to claim 1, further comprising the step of establishing a ranking among all of said plurality of nodes with said root node having the highest ranking.

3. The method according to claim 2, wherein said first available branch node has the lowest ranking of all of said available branch nodes and said next available branch node has the lowest ranking of the remaining of all of said next available branch nodes.

4. In a computer system, including a host computer, comprising an acyclic serial bus and a plurality of nodes coupled to said acyclic serial bus, each node having an identification packet, a method for mapping a node topology comprising the steps of:

A. storing in a topology map table information from said identification packets associated with each node of said plurality of nodes:

B. establishing a root node based upon information found in said identification packets;

C. establishing at least one branch node among said plurality of nodes based on said information;

D. selecting a first available branch node among said at least one branch node based on said information; and E. identifying any of said plurality of nodes that are leaf nodes to said first available branch node;

F. upon identification of all leaf nodes of said branch node, collapsing said branch node to a leaf node;

G. selecting a next available branch node based upon said information;

H. upon identification of said next available branch, identifying any of said plurality of nodes that are leaf nodes to said next available branch node, then repeat steps F through H until said root node is processed as a branch node.

5. The method according to claim 4, further comprising the step of establishing a ranking among all of said plurality of nodes with said root node having the highest ranking.

6. The method according to claim 5, wherein said first available branch node has the lowest ranking of all of said available branch nodes and said next available branch node has the lowest ranking of the remaining of all of said next available branch nodes.

7. In a computer system, including a host computer, comprising an acyclic serial bus and a plurality of nodes coupled to said acyclic serial bus, each node having an identification packet, a mapping system for establishing a node topology comprising:

A. means for storing in a topology mapping table information from said identification packet associated with each node of said plurality of nodes before establishing a root node;

B. means for establishing the root node based upon information found in said identification packets;

C. means for establishing at least one branch node among said plurality of nodes based on said information;

D. means for selecting a first available branch node among said at least one branch node based on said information;

E. means for identifying any of said plurality of nodes that are child nodes to said first available branch node;

F. means for selecting a next available branch node based upon said information; and G. means for identifying any of said plurality of nodes that are child nodes to said next available branch node.

8. The system according to claim 7, further comprising means for establishing a ranking among all of said plurality of nodes with said root node having the highest ranking.

9. The system according to claim 8, wherein said first available branch node has the lowest ranking of all of said available branch nodes and said next available branch node has the lowest ranking of the remaining of all of said next available branch nodes.

10. The system according to claim 7, including means for processing said root node as a branch node.

11. In a computer system, including a host computer, comprising an acyclic serial bus and a plurality of nodes coupled to said acyclic serial bus, each node having an identification packet, a method for mapping a node topology comprising the steps of:

A. establishing a root node based upon information found in said identification packets;

B. establishing at least one branch node among said plurality of nodes based on said information;

C. selecting a first available branch node among said at least one branch node based on said information;

D. identifying any of said plurality of nodes that are child nodes to said first available branch node;

E. upon identification of all child nodes of said branch node, selecting a next available branch node based upon said information;

F. upon identification of said next available branch, identifying any of said plurality of nodes that are children nodes to said next available branch node, then repeat steps E and F until said root node is processed as a branch node; and G. storing in the host computer the number of child nodes connected to each node, among all nodes of said plurality of nodes based on said information.

12. In a computer system, including a host computer, comprising an acyclic serial bus and a plurality of nodes coupled to said acyclic serial bus, each node having an identification packet, a method for mapping a node topology comprising the steps of:

A. establishing a root node based upon information found in said identification packets;

B. establishing at least one branch node among said plurality of nodes based on said information;

C. selecting a first available branch node among said at least one branch node based on said information;

D. identifying any of said plurality of nodes that are leaf nodes to said first available branch node;

E. upon identification of all leaf nodes of said branch node, collapsing said branch node to a leaf node;

F. selecting a next available branch node based upon said information;

G. upon identification of said next available branch, identifying any of said plurality of nodes that are leaf nodes to said next available branch node, then repeat steps E through G until said root node is processed as a branch node; and H. storing in the host computer the number of branch and leaf nodes among all nodes of said plurality of nodes based on said information.

13. In a computer system, including a host computer, comprising an acyclic serial bus and a plurality of nodes coupled to said acyclic serial bus, each node having an identification packet, a mapping system for establishing a node topology comprising:

A. means for establishing a root node based upon information found in said identification packets;

B. means for establishing at least one branch node among said plurality of nodes based on said information;

C. means for selecting a first available branch node among said at least one branch node based on said information;

D. means for identifying any of said plurality of nodes that are child nodes to said first available branch node;

E. means for selecting a next available branch node based upon said information;

F. means for identifying any of said plurality of nodes that are child nodes to said next available branch node; and G. means for storing in the host computer the number of branch and child nodes among all nodes of said plurality of nodes based on said information.

* * * * *